(12) United States Patent
Stervik

(10) Patent No.: US 6,695,705 B2
(45) Date of Patent: Feb. 24, 2004

(54) SHAFT COUPLING

(75) Inventor: Hans Stervik, Karna (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/065,009

(22) Filed: Sep. 9, 2002

(65) Prior Publication Data

US 2002/0198057 A1 Dec. 26, 2002

Related U.S. Application Data

(63) Continuation of application No. PCT/SE01/00143, filed on Jan. 25, 2001.

(51) Int. Cl.⁷ ................................................ F16C 3/02
(52) U.S. Cl. ........................................ 464/79; 464/181
(58) Field of Search ............................ 464/51, 79, 80, 464/180, 181, 183

(56) References Cited

U.S. PATENT DOCUMENTS

| | | | | |
|---|---|---|---|---|
| 1,658,750 A | * | 2/1928 | Weiland | 464/80 |
| 2,848,882 A | * | 8/1958 | Larsen et al. | 464/97 |
| 3,623,339 A | | 11/1971 | Muller | |
| 3,707,082 A | | 12/1972 | Ulics | |
| 4,173,128 A | | 11/1979 | Corvelli | |
| 4,512,209 A | * | 4/1985 | Linnemeier | 74/492 |
| 5,725,434 A | | 3/1998 | Haben et al. | |
| 6,328,656 B1 | * | 12/2001 | Uchikawa et al. | 464/183 |

\* cited by examiner

*Primary Examiner*—Lynne H. Browne
*Assistant Examiner*—Kenn Thompson
(74) *Attorney, Agent, or Firm*—Howrey Simon Arnold & White LLP

(57) ABSTRACT

Drive shaft coupling having in-series bellows segments of different flexural resistance. The bellows segment nearest a tube section presents less flexural resistance than the immediate following bellows segment. Each individual bellows segment may be dimensioned in such a way that stress is distributed evenly over all bellows segments so that the component may be optimized; for example, with respect to installation and strength. The variations in flexural resistance between the adjacent bellows segments may be produced by variations in the thickness of material of the bellows segments, variations in the outside diameter of the bellows segments, variations in the inside diameter of the bellows segments, variation of the radial angles of each bellows diaphragm in relation to the longitudinal axis of the coupling member, variation of the distance between adjacently positioned bellows segments, and/or variation of the composition of the material of construction of the bellows segments, including varying a mixture of glass fiber and carbon fiber in an epoxy composite material of construction, as well as the directions of orientation of the constituent fibers.

16 Claims, 2 Drawing Sheets

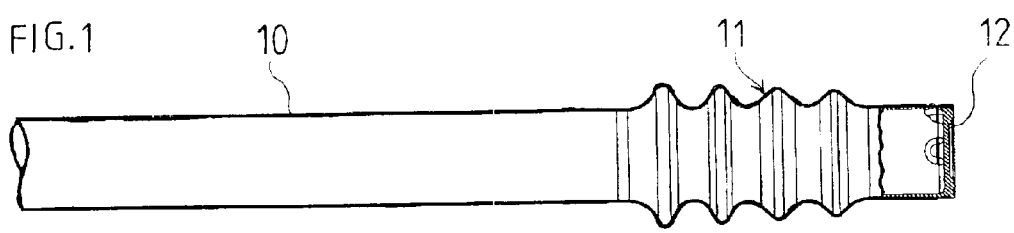
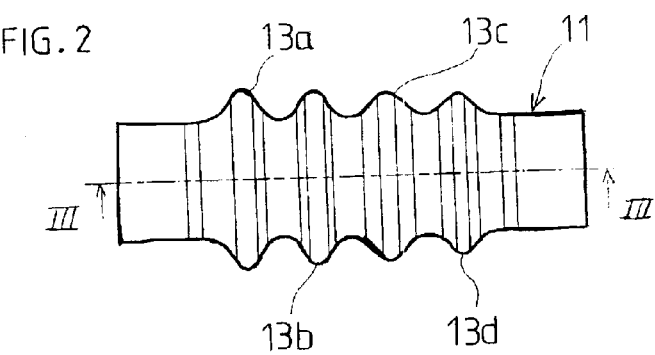

SHAFT COUPLING

CROSS REFERENCE TO RELATED APPLICATIONS

The present application is a continuation of International Application No. PCT/SE01 /00143, filed Jan. 25, 2001 and published in English pursuant to PCT Article 21(2), now abandoned, and which claims priority to Swedish Application No. 0000816-9 filed Mar. 9, 2000. Said applications are hereby incorporated by reference in their entireties.

BACKGROUND OF INVENTION

1. Technical Field

The present invention relates to a drive shaft coupling for transfer of torsional force between a shaft and a rotatable element. The drive shaft coupling includes a rigid tube section and a flexible coupling member connected to the tube section, with at least two, in-series connected bellows segments that enable center axis deviations between the shaft and the rotatable element.

2. Background of the Invention

There is a permanent demand for reduced fuel consumption for all types of vehicles. One way to reduce fuel consumption is to lower the total weight of the vehicle, generally by using new material with lower weight than for corresponding traditional solutions. One example of such development is the use of composite material for parts of the power transmission of a vehicle from the motor/gearbox to the drive wheels. Thus, it is possible to produce a drive shaft with included flexible couplings manufactured from composite material.

U.S. Pat. No. 5,725,434 discloses a shaft of composite material with an integrated, elastically deformable coupling flange enabling center axis deviations at the mounting end of the shaft. A problem with this known drive shaft coupling is that it is comparatively bulky, as the coupling flange is radially large.

U.S. Pat. No. 4,173,128 disclose a shaft laminated of composite material with flexible coupling sections adjacent the ends of the shaft. These flexible-coupling sections include, in series, coupled bellows with identical geometry and elasticity for bending. The need for space is reduced radially by using in-series coupled bellows. It has come to be appreciated, however, that this type of drive shaft coupling is less suitable for uses where the center axis deviations between bellows is comparatively large and high torque occurs. One example of such over-burdening use is as propeller shafts for heavy trucks.

SUMMARY OF INVENTION

In one aspect, the present invention takes the form of a provision of a drive shaft coupling with a small space requirements and which copes with large angle movements as well as high torsion. In this regard, the invention includes a drive shaft coupling having two adjacent bellows segments of different flexural resistance. The bellows segment nearest a tube section connected thereto presents less flexural resistance than the immediate following bellows segment. By this design of the drive shaft coupling, each individual bellows segment may be dimensioned in such a way that stress is distributed evenly over all bellows segments so that the component may be optimized; for example, with respect to installation and strength. Another improvement over known universal joint shafts is an increased freedom for installation of the driveline. A shaft designed according to the present invention does not need to have equal angle of articulation in the bellows as a universal joint shaft has in known universal joint designs.

In one embodiment of the invention, the variations in flexural resistance between two adjacent bellows segments may be produced by variations in the thickness of material of the bellows segments. Alternatively, these variations may be produced by variations in the outside diameter of the bellows segments.

In another embodiment of the invention, the variations in flexural resistance between two adjacent bellows segments are produced by variations in the inside diameter of the bellows segments. Alternatively, these variations may be produced by variation of the radial angles of each bellows diaphragm in relation to the longitudinal axis of the coupling member.

In still another embodiment of the invention, the variations in flexural resistance between in-series connected bellows segments are produced by variation of the distance between adjacently positioned bellows segments.

According to a preferred embodiment of the invention, the coupling member is manufactured from an epoxy composite with a mixture of glass fiber and carbon fiber. The variations in flexural resistance between two adjacent bellows segments can then be produced by variation of the fiber direction in the composite material.

Still further, the tube section and the coupling member may be manufactured in one piece from steel.

BRIEF DESCRIPTION OF DRAWINGS

The invention will be further described in the following, in a non-limiting way with reference to the accompanying drawings in which:

FIG. 1 is a partial cutaway side view of a drive shaft coupling configured according to the present invention;

FIG. 2 is a side view of a coupling member as a part of the drive shaft coupling;

DETAILED DESCRIPTION

Figure 3:
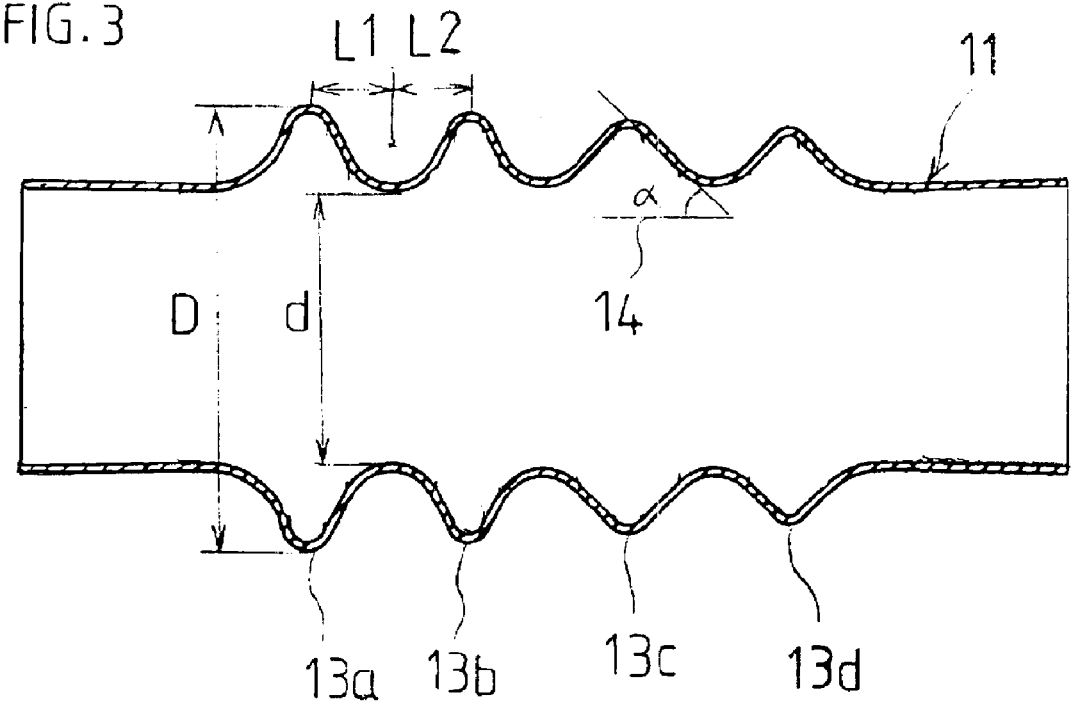
FIG. 3 is a cross-sectional view taken along the line III—III in FIG. 2.
Figure 4:
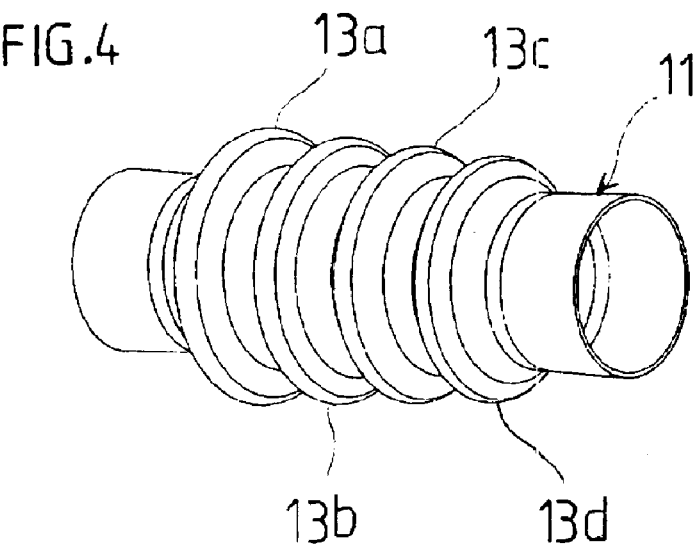
FIG. 4 is a perspective view of the coupling member.

The drive shaft coupling shown in FIG. 1 is intended to be used as a universal joint shaft on an vehicle and includes a stiff tube section 10 and a coupling member 11. For this field of use, the drive shaft coupling preferably comprises mirror-inverted arranged coupling members 11, in the respective end of the tube section 10, but for any other field of use, it would be possible to use only a single coupling member 11.

An end piece 12 is mounted at a free end of the coupling member for connection to a rotor; for example, that of a differential gear at the rear axle of a vehicle. In order to provide corresponding flexibility as found in a conventional universal joint with respect to angular deviation, the coupling member 11 of the illustrated embodiment is provided with four in-series interlinked bellows segments 13a, 13b, 13c and 13d.

The bellows segments 13 are individually designed, so that they exhibit different flexural resistance. Thus, the bellows segment 13a nearest the tube section 10 exhibits a lower flexural resistance than the immediate following bellows segment 13b. At the same time, the bellows segment 13b exhibits a lower flexural resistance than the immediate following bellows segment 13c, and the bellows segment 13c a lower flexural resistance than the immediate following bellows segment 13d.

In a series of two or more interconnected bellows segments, the bellows segment located closest to the point of attachment, for example, the end piece 12 will normally be exposed to the largest bending load. The bending load and the deformation due to stress of the tube section will be distributed equally between the different bellows segments due to the above-described design of the coupling member 11.

In the embodiment shown in the figures, the variations in flexural resistance have been produced foremost by two measures. On one hand the different bellows segments have been given different outer diameters in such a way that the bellows segment 13a closest to the tube section 10 has a larger outer diameter (D) than the immediate following bellows segment 13b. At the same time, the bellows segment 13b exhibits a larger outer diameter than the immediate following bellows segment 13c, and the bellows segment 13c has a larger outer diameter than the next following bellows segment 13d. In this case, a reduced outer diameter provides increased flexural resistance in the bellows segment and vice versa.

Alternatively and/or additionally, variations in flexural resistance between two adjacent bellows segments have been produced by variation of the radial angles * of the bellows diaphragm in relation to the longitudinal axis of the coupling member. The diaphragm sides of the bellows segment 13a immediate the tube section 10 exhibit a more blunt (greater inclination) angle * towards the longitudinal axis 14 of the coupling member than the diaphragm sides of the next following bellows segment 13b. Analogous to this, the diaphragm sides of the bellows segments 13d accordingly exhibits the most pointed (small) angle with respect to the longitudinal axis 14 of the coupling member. In this case, a more pointed angle * results in more flexural resistance in the bellows segments and vice versa. Due to this difference in angle, the distances L1 and L2 (see FIG. 3) will usually differ. However, one is not limited to embodiments where a straight line forms a tangential connection between two radiuses, instead the different bellows segments of the coupling member may be designed at will, with varying curvature.

Other measures may be used for producing the different desired degrees of flexural resistance in the respective bellows segments. For example, the flexural resistance may be varied by altering the material thickness in the bellows so that an increased thickness of material results in increasing flexural resistance in the bellows segment and vice versa. Also, the flexural resistance may be varied by altering the inner diameter (d) of the bellows in such a way that a reduction of the inner diameter produces a reduced flexural resistance and vice versa. Further, a drive shaft coupling produced from an epoxy composite with a fiber mat may be varied with regard to the orientation of the fiber mats with reference to the longitudinal axis 14 of the drive shaft coupling so that specific different flexural resistances are produced in the respective bellows segments. Still further, the composition of the composite material may be varied between different bellows segments in the coupling member; for example, so that different flexural resistance is produced by variation of the large quantity proportions epoxy/fiber. Glass fiber, carbon fiber, KEVLAR-fiber and tungsten fiber serve as examples of suitable fibers for use in the manufacture of the coupling member of the present invention.

The drive shaft coupling according to the present invention may also be produced from suitable tubular steel, wherein the last mentioned variants for producing variation in flexural resistance are omitted.

The invention is not limited to the above-described embodiments; additional configurations and modifications are possible while still remaining within the scope of the following claims.

What is claimed is:

1. A drive shaft coupling for transfer of torsion force between a shaft and a rotatable element in the driveline of a motor vehicle, said drive shaft coupling consisting of:

a rigid tube section in one-piece construction with a substantially hollow flexible section that is flexible along a center axis thereof under vehicle operating conditions, the substantially hollow flexible section having at least two in-series bellows segments that enable center axis deviations between the shaft and the rotatable element, at least two adjacent bellows segments of the in-series bellows segments, having different flexural resistances, and a bellows segment nearest the rigid tube section presenting less flexural resistance than bellows positioned further away from the rigid tube section.

2. The drive shaft coupling according to claim 1, wherein at least two in-series bellows segments have different thickness thereby causing variations in flexural resistance between said two adjacent bellows segments.

3. The drive shaft coupling according to claim 1, wherein at least two in-series bellows segments have different outside diameters (D) thereby causing variations in flexural resistance between said two adjacent bellows segments.

4. The drive shaft coupling according to claim 1, wherein at least two in-series bellows segments have different inside diameters (d) thereby causing variations in flexural resistance between said two adjacent bellows segments.

5. The drive shaft coupling according to claim 1, wherein at least two in-series bellows segments have different diaphragm radial angles ($\alpha$) relative to a longitudinal axis of said drive shaft coupling thereby causing variations in flexural resistance between said two adjacent bellows segments.

6. A drive shaft coupling for transfer of torsion force between a shaft and a rotatable element, said drive shaft coupling comprising:

a rigid tube section and a substantially hollow flexible coupling member connected to the tube section with at least two in-series connected bellows segments that enable center axis deviations between the shaft and the rotatable element, in-series adjacent bellows segments, at least two of which have different flexural resistance compared to the other of the two and wherein the bellows segment nearest the rigid tube section presents less flexural resistance than bellows positioned opposite thereto, and wherein different connective distances between at least two pairs of adjacent in-series bellows segments thereby causing variations in flexural resistance between said two adjacent bellows segments.

7. The drive shaft coupling according to claim 1, wherein said coupling member is manufactured from an epoxy composite having a mixture of glass fiber and carbon fiber.

8. A drive shaft coupling for transfer of torsion force between a shaft and a rotatable element, said drive shaft coupling comprising:

a rigid tube section and a substantially hollow flexible coupling member connected to the tube section with at least two in-series connected bellows segments that enable center axis deviations between the shaft and the rotatable element, in-series adjacent bellows segments, at least two of which have different flexural resistance compared to the other of the two and wherein the bellows segment nearest the rigid tube section presents less flexural resistance than bellows positioned opposite thereto, and wherein said coupling member being manufactured from an epoxy composite having a mixture of glass fiber and carbon fiber, and wherein directions of orientation of fibers in at least two in-series bellows segments are different thereby causing variations in flexural resistance between said two adjacent bellows segments.

9. The drive shaft coupling according to claim 6, wherein said tube section and said flexible coupling member are of one-piece steel construction.

10. The drive shaft coupling according to claim 6, wherein at least two in-series bellows segments have different thickness thereby causing variations in flexural resistance between said two adjacent bellows segments.

11. The drive shaft coupling according to claim 6, wherein at least two in-series bellows segments have different outside diameters (D) thereby causing variations in flexural resistance between said two adjacent bellows segments.

12. The drive shaft coupling according to claim 6, wherein at least two in-series bellows segments have different inside diameters (d) thereby causing variations in flexural resistance between said two adjacent bellows segments.

13. The drive shaft coupling according to claim 6, wherein at least two in-series bellows segments have different diaphragm radial angles ($\alpha$) relative to a longitudinal axis of said drive shaft coupling thereby causing variations in flexural resistance between said two adjacent bellows segments.

14. The drive shaft coupling according to claim 6, wherein said coupling member is constructed of epoxy composite having a mixture of glass fiber and carbon fiber.

15. A drive shaft coupling for transfer of torsion force between a shaft and a rotatable element in the driveline of a motor vehicle, said drive shaft coupling comprising:

a rigid tube section constructed in one-piece with a substantially hollow flexible section capable of flexure along a center axis thereof under vehicle operating conditions, the substantially hollow flexible section comprising at least three bellows segments establishing at least two pairs of bellows segments, and each of the at least two of the pairs of bellow segments having different connective distances therebetween resulting in variations in flexural resistance between the at least two pairs of bellows segments.

16. A drive shaft coupling for transfer of torsion force between a shaft and a rotatable element in the driveline of a motor vehicle, said drive shaft coupling consisting of, between opposite terminal ends thereof, the following:

a rigid tube section constructed in one-piece with a substantially hollow flexible section capable of flexure along a center axis thereof under vehicle operating conditions, the substantially hollow flexible section having at least two in-series bellows segments that are arranged so that a bellows segment nearest the rigid tube section possesses less flexural resistance than bellows positioned further away from the rigid tube section.

* * * * *

UNITED STATES PATENT AND TRADEMARK OFFICE
CERTIFICATE OF CORRECTION

PATENT NO. : 6,695,705 B2 Page 1 of 1
DATED : February 24, 2004
INVENTOR(S) : Hans Stervik It is certified that error appears in the above-identified patent and that said Letters Patent is hereby corrected as shown below:

<u>Title page,</u>
Item [30], please add as follows:
-- Foreign Application Priority Data
March 9, 2000 (SE) ............. 0000816-9 --

Signed and Sealed this

Fourth Day of May, 2004

JON W. DUDAS
*Acting Director of the United States Patent and Trademark Office*